United States Patent [19]
Sirkar et al.

[11] Patent Number: 5,637,224
[45] Date of Patent: Jun. 10, 1997

[54] HOLLOW FIBER CONTAINED LIQUID MEMBRANE PERVAPORATION FOR REMOVAL OF VOLATILE ORGANIC COMPOUNDS FROM AQUEOUS SOLUTIONS

[75] Inventors: Kamalesh K. Sirkar, Berkeley Heights, N.J.; Dali Yang, Towson, Md.; Sudipto Majumdar, Ridgefield; Suphan Kovenklioglu, Chatham, both of N.J.; Amitava Sengupta, Charlotte, N.C.

[73] Assignee: New Jersey Institute Of Technology, Newark, N.J.

[21] Appl. No.: 305,873

[22] Filed: Sep. 14, 1994

[51] Int. Cl.⁶ ................................................. B01D 61/24
[52] U.S. Cl. ........................ 210/644; 210/406; 210/500.23
[58] Field of Search .............................. 210/406, 640, 210/500.23, 644, 321.8, 321.89, 500.36

[56] References Cited

U.S. PATENT DOCUMENTS

| | | |
|---|---|---|
| 4,750,918 | 6/1988 | Sirkar . |
| 4,789,468 | 12/1988 | Sirkar . |
| 4,921,612 | 5/1990 | Sirkar . |
| 4,952,751 | 8/1990 | Blume et al. ........................ 210/640 X |
| 4,973,434 | 11/1990 | Sirkar et al. . |
| 5,013,447 | 5/1991 | Lee et al. ............................... 210/640 |
| 5,053,132 | 10/1991 | Sirkar . |
| 5,131,266 | 7/1992 | Hassett ............................... 210/644 X |

OTHER PUBLICATIONS

Dutta and Sikdar, Separation of azeotropic organic liquid mixtures by pervaporation, AIChE J. 37:581–88. (1991).
Blume et al., The separation of dissolved organics from water by pervaporation, J. Membrane Sci. 49:253–86. (1990).
Lipski and Côté, The use of pervaporation for the removal of organic contaminants from water, Environmental Progress 9:254–61 (1990).
Sengupta et al., Separation of solutes from aqueous solutions by contained liquid membranes, AIChE J. 34(10):1698–08 (1988).
Brun et al., Sorption and pervaporation of dilute aqueous solutions of organic compounds through polymer membranes, J. Membrane Sci. 25:55–100 (1985).
Kiani et al., Solvent extraction with immobilized interfaces in a microporous hydrophobic membrane, J. Membrane Sci. 20: 125–45 (1984).
Kim, Membrane based extraction for selective removal and recovery of metals, J. Membrane Sci. 21:5–19 (1984).

Primary Examiner—Frank Spear
Attorney, Agent, or Firm—Klauber & Jackson

[57] ABSTRACT

A vaporizable solute transfer system for transferring a vaporizable solute from an aqueous feed solution to an extractant liquid comprises a fluid tight housing, a porous membrane which divides the housing into a feed solution chamber and an extractant chamber, and a vacuum atmosphere chamber formed of a nonporous material. The housing has feed solution inlet and outlet ports which communicate with the feed solution chamber, an extraction inlet port which communicates with the extractant chamber, and a vacuum outlet port which communicates with the vacuum atmosphere chamber. The vaporizable solute transfer system also includes a pressure difference control means for maintaining a difference between a liquid pressure of a feed solution chamber and a liquid pressure of an extractant liquid in the extractant chamber substantially within a predetermined pressure range so that an interface between the feed solution and the extractant is substantially immobilized at the membrane. The vaporizable solute transfer system is particularly adapted for transferring vaporizable solute from a feed solution to an extractant, which feed solution and extractant may be immiscible with one another when in direct contact.

48 Claims, 5 Drawing Sheets

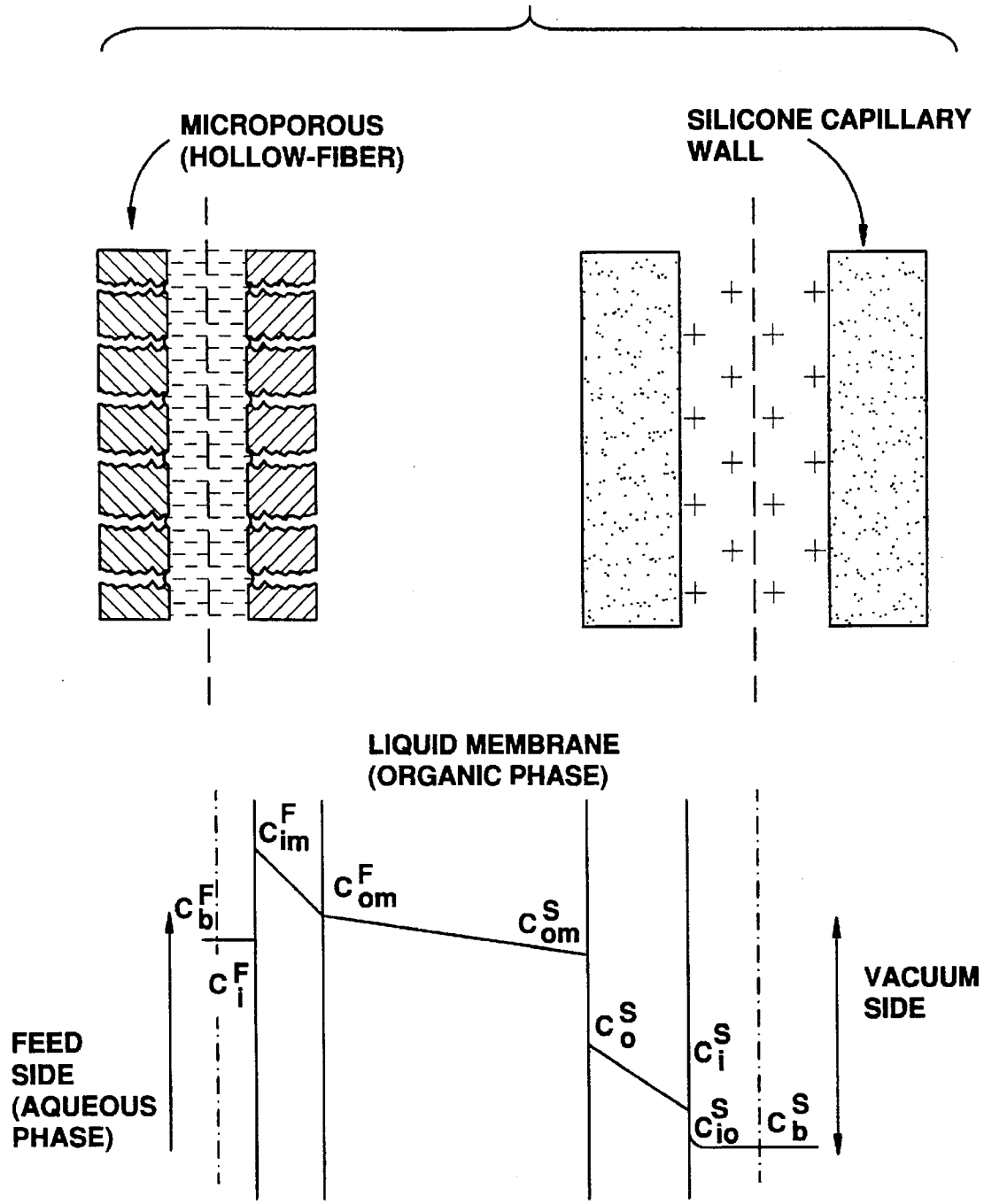

— Q=3.52 (ml/min) (Theoretical Value)
○ Experimental data
······ Q=6.30 (ml/min) (Theoretical Value)
△ Experimental data
—·— Q=9.28 (ml/min) (Theoretical Value)
□ Experimental data

HOLLOW FIBER CONTAINED LIQUID MEMBRANE PERVAPORATION FOR REMOVAL OF VOLATILE ORGANIC COMPOUNDS FROM AQUEOUS SOLUTIONS

FIELD OF INVENTION

The present invention relates to an apparatus for removing volatile organic compounds from aqueous solutions, and collecting the organic compounds in condensed form.

BACKGROUND OF THE INVENTION

It is known that liquid-liquid extractions can remove water from liquid organics, remove volatile organics from water, or separate an organic mixture. In chemical processes, liquid-liquid extractions are often used to transfer a solute dissolved in a first liquid to a second liquid. The second liquid may be partially miscible or essentially immiscible with the first liquid. The first liquid can generally be termed the "feed solution" and the second liquid is generally termed the "extractant." In an undissolved state, the solute can be a solid, liquid or gas. The solute tends to distribute itself between the two liquids in accordance with the relative solubility of the solute in the two liquids when the feed solution is brought into contact with the extractant.

In the past, most liquid membrane based processes were unstable due either to dissolution or evaporation into the surroundings. A number of separation devices have been described.

U.S. Pat. No. 3,956,112 to Lee, et al., May 1976, issued relates generally to an extraction process in which a porous membrane serves as a partition between two immiscible solvents. Solutes from one solvent are transferred to the other by way of the porous membrane via direct solvent-solvent contact. In practice, conventional extraction processes in which immiscible solvents are separated by a porous membrane generally do not prevent one solvent from forming a dispersion in the other. One or the other solvent typically seeps through the porous membrane and becomes dispersed in the solvent on the other side of the membrane. Consequently, conventional extraction processes involving immiscible solvents separated by a porous membrane often provide a settling tank and a solvent return mechanism to coalesce any dispersion formed by the seepage of one of the solvents through the membrane and to return the solvent so recovered to its source [B. M. Kim, Membrane based extraction for selective removal and recovery of metals, J. Membrane Sci., 21 (1984) 5–19].

U.S. Pat. No. 4,750,918 to Sirkar, issued June 1988, relates to an apparatus which permits a gas to be selectively transferred from a feed gas mixture to an output fluid.

U.S. Pat. No. 4,973,434 to Sirkar et al., issued November 1990, relates to a single-ply immobilized liquid membrane comprising an aqueous liquid membrane which is immobilized within a hydrophobic microporous support, and the process for making such a membrane.

U.S. Pat. No. 4,789,468 to Sirkar, issued December 1988, relates to an apparatus for liquid-liquid solute-transfer. The apparatus consists of a feed solution chamber, a liquid extractant chamber, and a pressure-difference regulator. In operation, the feed solution is pumped into the feed solution chamber at a substantially constant rate under pressure. The extractant is pumped into the extractant chamber at a controlled pressure. The feed solution contacts one side of a porous membrane, while the extractant contacts the other side of the porous membrane. One of the two phases, the feed solution or the extractant, wets the pores of the membrane. Pressures of the feed solution and the extractant are imposed, in directions and magnitude, to substantially immobilize the interface between the feed solution and the extractant at the porous membrane. The solute passes through the pores of the membrane into the extractant. The extractant is then discharged from the housing. This invention provides for removal of the solute from the extractant by using a second chamber where a phase similar to the feed phase is used. Thus the solute is not recovered as such.

U.S. Pat. No. 4,921,612 to Sirkar, issued May 1990, relates to an asymmetrically-wettable porous membrane and a process for transferring solute from a liquid feed solution to a liquid extractant, which is substantially immiscible with the feed solution. The housing of the unit has an asymmetrically-wettable porous membrane that divides the interior of the housing into a feed chamber, into which a feed solution is pumped then discharged, and an extractant chamber, into which an extractant is pumped then discharged. The side of the membrane facing the aqueous feed solution chamber is hydrophilic, whereas the side of the membrane facing the organic extractant chamber is hydrophobic. Pores in the membrane permit communication between the feed solution and the extractant. The solute diffuses into the extractant. The extractant containing the solute is then discharged from the unit.

U.S. Pat. No. 5,053,132 to Sirkar, issued October 1991, is a continuation of the previously discussed patent which relates to the asymmetrically-wettable porous membrane.

Notwithstanding the foregoing, the inventors herein have recognized that there is a need in the art for a separation device that does not require discharge of the extractant liquid.

The citation of any reference herein should not be deemed an admission that such reference is available as prior art to the invention.

SUMMARY OF THE INVENTION

The present invention provides an immobilized-interface vaporizable solute-transfer unit for transferring a vaporizable solute from a feed solution to an extractant liquid, and for removing the solute from the extractant solution, thereby regenerating the extractant solution and isolating the solute. The solute transfer unit is comprised of a fluid-tight housing. Located in and connected to the housing is a porous membrane. The porous membrane, which is preferentially wettable by one of the feed solution and liquid extractant, divides the housing into a feed solution chamber and an extractant chamber. The housing has a feed solution inlet port and a feed solution outlet port which communicate with the feed solution chamber. A pressure difference control means maintains a difference between a liquid pressure of a feed solution in the feed solution chamber and a liquid pressure of an extractant in the extractant chamber, so that an interface between the feed solution and the extractant is substantially immobilized at the porous membrane to effectively prevent the formation of a dispersion of feed solution and extractant in either chamber on opposing sides of the membranes.

Additionally, located in and connected to the housing, is a vacuum chamber fabricated from a nonporous material that is permeable to the vaporizable solute. The nonporous material contacts the liquid extractant. The housing has a vacuum outlet port which communicates with the vacuum chamber. Thus, the present invention provides a liquid membrane based apparatus for separating volatile organic compounds from aqueous solutions into an extractant liquid and drawing the volatile organic compounds into a vacuum, where the compounds can be collected in condensed form.

In a particular embodiment, the immobilized-interface vaporizable solute-transfer unit is a hollow fiber contained liquid membrane system. In the hollow fiber contained liquid membrane (HFCLM) system, one set of hydrophobic porous fibers, into which the aqueous stream is fed, is packed in a shell-and-tube type heat exchanger arrangement along with a second set of nonporous hollow fibers. The two sets of fibers, which are in relatively close proximity to each other, are separated by a liquid extractant. Preferably, the liquid extractant is a highly selective organic liquid membrane in which water has very low solubility. Alternatively, the liquid extractant can be a non-volatile polar liquid. The solute transferred to the liquid extractant will be drawn into the vacuum in the lumen of the nonporous hollow fibers. The ability to draw off the solute transferred to the liquid extractant is an improvement since the solute may then be easily condensed and recovered, saving these materials, the liquid extractant is constantly regenerated. Additionally, the improvement provides greater efficiency, making its use in the field of waste management more desirable.

Thus, a primary object of the invention is to provide an apparatus which separates and simultaneously concentrates volatile organic compounds from aqueous solutions.

Another object of the invention is to provide an apparatus in which stable liquid membrane-based processes may be performed for liquid separations using liquid membranes with higher selectivity for volatile organics and lower water flux.

Another object of the invention is to provide an apparatus in which stable liquid membrane-based processes may be performed to simultaneously separate and concentrate volatile inorganic compounds from aqueous solutions.

These and other objects will be apparent to those of ordinary skill from the teachings herein.

BRIEF DESCRIPTION OF DRAWINGS

FIG. 5 shows typical solute concentration profiles in the Hollow Fiber Contained Liquid Membrane (HFCLM) pervaporator.

DETAILED DESCRIPTION OF THE INVENTION

Figure 1:
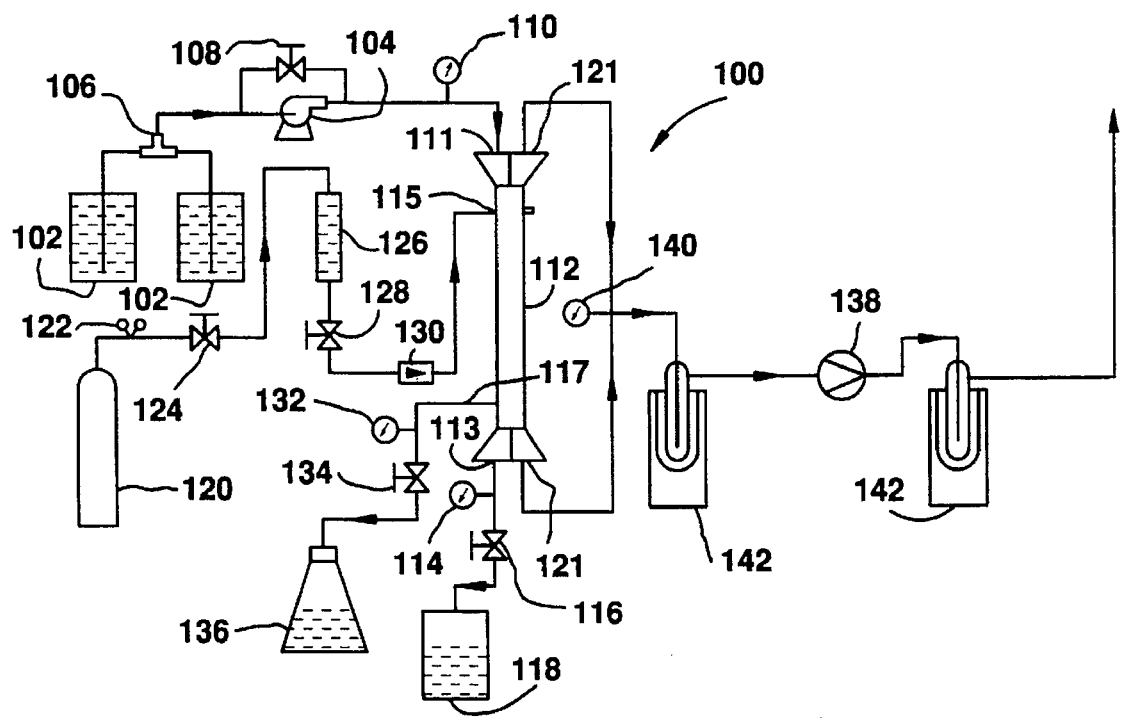
FIG. 1 is a schematic diagram of a hollow fiber contained liquid membrane pervaporation system.

The present invention, for removing vaporizable solutes from aqueous solutions and collecting the solutes in condensed form, is comprised of a fluid tight housing. Within the housing is a preferentially wettable porous membrane which divides the housing into two chambers. One chamber contains a feed solution and the other contains a liquid extractant. A pressure difference control means maintains a pressure difference between the feed solution, in the feed solution chamber, and the liquid extractant, in the extractant chamber. This pressure difference substantially immobilizes an interface between the feed solution and the extractant at the membrane to effectively prevent the formation of a dispersion of feed solution in either chamber on opposing sides of the membrane. The housing also contains a nonporous material, which is formed as a third, vacuum atmosphere, chamber. The nonporous material contacts the liquid extractant and is permeable to the volatile organic compounds.

A fluid tight housing of the invention can have any geometric shape, e.g., cylindrical, cubic (square or rectangle), etc. The porous and non-porous membranes can adopt any orientation within the fluid tight housing.

For example, the fluid tight housing may have a flat rectangular shape. Within the housing, a porous membrane is oriented as a sheet co-planar with the plane of the housing having the greatest surface area to divide the interior of the housing into a feed solution chamber and an extractant chamber. A non-porous membrane is oriented between the porous membrane and a wall of the housing in the extractant chamber to provide for application of vacuum. In this "flat sheet" embodiment, the maximum possible surface area for the membranes provides for maximum efficiency of transfer of solute from the feed solution of the extractant, and from there into the vacuum.

In a preferred aspect, the solute transfer unit of the invention is a "Hollow Fiber Contained Liquid Membrane System". The term "Hollow Fiber Contained Liquid Membrane System" or equivalent, "HFCLM System", refers to a pervaporation system in which both liquid and gas separations occur. In this type of system, the highly selective organic liquid membrane is contained in the shell side between two sets of hollow fibers packed in a shell-and-tube heat exchanger type arrangement.

The term "Silicone Rubber Hollow Fibers System" or equivalent, "SRHF System", refers to a single fiber-set pervaporation system where the aqueous stream is fed into silicone rubber hollow fibers with a vacuum applied outside the hollow fibers. The reverse configuration is also possible.

As used herein, the term "vaporizable solute" refers to solutes such as volatile organic compounds. The term volatile organic compounds, or equivalent, "VOC", is used herein to denote any organic compound having a boiling point of up to 150° to 160°. Specific examples of VOCs include: trichloroethylene, toluene, xylene, acetone, trichloromethane, methanol, ethanol, methyl ethyl ketone, carbon tetrachloride, isobutanol, chlorobenzene, pentane, hexane, octane, fluorinated hydrocarbons (CFC-11, CFC-12, CFC-113, CFC-114, CFC-115, etc.), HCFC ($C_2HCl_2F_3$), perchloroethylene, propanol, butanol, acetic acid, propionic acid, butyric acid, lactic acid, alkanes, aromatics, cyclic compounds (including alkyl), ethers, ketones, aldehydes, amines, etc., to mention but a few. Those skilled in the art will recognize the above list of examples is not exhaustive.

The term, "volatile inorganic compounds", or equivalent, "VIC", is used herein to denote any inorganic compound with a high vapor pressure or low boiling point. Specific examples of VICs include hydrogen chloride, nitric acid, $CO_2$, $H_2S$, $SO_2$, etc.

The term "aqueous" refers to a polar liquid solution containing water and other polar compounds. In the present invention, the aqueous solution contains volatile organic compounds. The source of the aqueous solution containing volatile organic compounds may be, for example, wastewater, streams used in industrial processing, fermentation broths, etc.

The term "porous membrane" or "microporous membrane" refers to a hydrophobic, hydrophilic, or an asymmetric (hydrophobic on one surface, hydrophilic on the other) material containing pores having a diameter between 1 nm to about 10 μm. The volatile organic compounds pass from the feed solution to the liquid extractant at the pores. The pores, therefore, should be of a sufficient size so as to permit the feed solution and extractant liquid to form an interface that allows solute to pass through the pores. The pores allow the feed solution and the liquid extractant to form an interface.

According to the invention, porous membranes with a thickness range of 1 μm–40 μm are preferred. Preferably, the membrane is provided in the form of a hollow fiber. However, other arrangements are also contemplated, such as sheets dividing one or more chambers (collectively the feed chamber and extractant chamber). The membrane should be mechanically strong enough to withstand the interface-immobilizing pressure difference imposed across the membrane. Reinforcement may be used if needed.

The membrane may swell in the presence of the feed solution or the extractant, but this is not a disadvantage as long as the swollen membrane is strong enough to withstand the interface-immobilizing pressure.

The term "extractant liquid" refers in one embodiment to an apolar organic liquid that can be used to form a liquid membrane. The extractant liquid may be any organic liquid membrane which has a high boiling point. Additionally, water should be sparingly soluble in the liquid extractant. Examples of suitable extractant liquids include decanol, octanol, long chain alkanes, such as dodecane, vegetable oil, silicone oil, mineral oil, and the like. The liquid extractant can further contain organic complexing agents that complex reversibly with the volatile solute. Such agents include, liquid ion exchangers, chelating agents, acid extracting agents, basic extracting agents, and the like. Examples include: long chain alkylamines for complexing acidic species and acidic extracting agents for complexing basic species. Those skilled in the art will recognize that the above list of examples is not exhaustive.

In a second embodiment, in which the pervaporation feed mixture contains organic substances, the liquid extractant may be a non-volatile, inert polar liquid. Examples of nonvolatile polar liquids include n-methyl pyrrolidone, dimethyl sulfoxide, polyethylene glycol, etc.

According to the invention, the extractant liquid forms a liquid membrane separating the microporous membrane, which defines the feed chamber, from the nonporous membrane, which defines a vacuum atmosphere chamber. Preferably the thickness of this extractant liquid membrane, i.e., the distance from the porous membrane to the nonporous vacuum chamber, is about 50 μm to about 1000 μm.

In order to have effective solute transfer, an interface-immobilizing pressure difference should be imposed in a direction to oppose the tendency of the membrane-wetting liquid to pass through the membrane. In order to achieve this, a greater pressure is imposed on the liquid opposite to the membrane wetting-liquid in order to oppose the tendency of the membrane-wetting liquid to pass through the membrane. Thus, if a hydrophobic membrane is used, the aqueous feed solution must be introduced at a higher pressure than the extractant liquid. Alternatively, if a hydrophilic membrane is used, the aqueous feed solution must be introduced at a lower pressure than that of the extractant liquid.

The range of differences in pressure effective to immobilize the interface between a particular feed solution and extractant at a particular porous membrane depends on a number of factors, including the relative tendency of the feed solution and the extractant to wet the membrane material, the interfacial tension between the feed solution and the extractant, the flow characteristics of each liquid at the surface of the membrane, and the effective diameters of the pores of the membranes. Therefore, the maximum value of the pressure difference effective to immobilize the interface between the feed solution and the extractant at the porous membrane is optimally determined empirically. The minimum value should be zero when both phases are at the same pressure. A pressure difference range of 0–150 psi has been found to be suitable for certain applications. In a specific embodiment, a pressure of 8–10 psig was maintained for the aqueous stream and a pressure of 6–7 psig was maintained for the organic liquid, thus the pressure difference was 2–3 psig.

The regeneration of extractant, as accomplished in the present invention, is an important improvement to existing solute transfer devices. An advantage of the present invention is that saturation limitation of the extractant does not occur. In the past, the amount of solute transferred to the extractant had to be monitored so as to prevent saturation of the extractant. Thus, the present invention is more efficient than previous solute transfer devices.

The term "hydrophobic" describes a substance which does not absorb or adsorb water. Preferred hydrophobic membranes include porous polyethylene, porous polytetrafluoroethylene (PTFE), porous polyimides, porous polyetherketones, porous polyvinylidene fluoride, porous polyvinylchloride, porous polysulfone, porous polyethersulfone, or porous polypropylene, for example, CELGARD® (Hoechst Celanese, SPD, Charlotte, N.C.). More specifically, the hydrophobic membranes may be CELGARD® brand porous polypropylene x-20 and x-10. Those skilled in the art will recognize that the above list of examples is not exhaustive.

The term "hydrophilic" describes a substance that readily associates with water. Preferred hydrophilic membranes include porous regenerated cellulose, porous cellulose acetate, porous cellulose acetate-nitrate, porous cellulose triacetate, microporous glass, porous porcelain, porous polyamides, porous hydrophilized polypropylene, porous polyesters, and porous polyacrylonitrile. The term "porous hydrophilized polypropylene" refers to a polypropylene that has been surface modified by derivitization with hydrophilic groups. Those skilled in the art will recognize that the above list of examples is not exhaustive.

As used herein, the term "nonporous material" refers to a material used to fabricate the vacuum chamber, e.g., a wall of a hollow fiber. The nonporous material is nevertheless permeable to the vaporizable solutes. The nonporous hollow fibers may be, for example, silicone rubber capillaries, porous hollow fibers with an ultrathin nonporous skin of plasma polymerized silicone, or dip-coated silicone on the hollow fiber outer surface. Those skilled in the art will recognize that the above list of examples is not exhaustive.

The term "ultrathin" when referring to the thickness of a highly solute-permeable plasma polymerized nonporous silicone skin on the outside surface of the porous membrane means approximately 0.1 μm to 10 μm in thickness; preferably about 1 μm. This ultrathin nonporous skin is a significant barrier to permeation for the higher molecular weight liquid extractant molecules. The skin is developed by plasma polymerization on the microporous substrate. The skin develops an integral bonding with the substrate which has a much greater resistance to solvent swelling than conventional silicone rubber coatings. Examples of ultrathin nonporous skin include rubbers like dimethylsilicone, copolymers of siliconepolycarbonate, poly (1-trimethyl silyl-1-propyne), fluoroelastomers, polyurethane, and polyvinylchloride, to mention a few.

A specific embodiment of the invention, 100, is shown schematically in FIG. 1. In the feed section, the aqueous feed solution containing a volatile organic compound or compounds, such as, trichloroethylene, toluene, or both, is stored in vessels, 102. The feed solution is pumped, by a metering pump, 104, through a three-way ball valve, 106, and a two-way ball valve, 108. The flow pressure of the feed solution is monitored by a pressure gage, 110, at the feed solution inlet, 111 to the module, 112. Another pressure gage, 114, and a micro-metering valve, 116, are located at the feed solution outlet, 113, of the module so as to maintain a feed pressure through the module. The feed solution which is discharged from the module is stored in a storage vessel, 118.

In the liquid membrane reservoir section, pressurized $N_2$ gas is stored in a cylinder, 120. The pressure is regulated by a pressure regulator, 122. When a two-way valve, 124, is in the open position, the pressurized gas flows into the extractant liquid membrane reservoir, 126, which is a 500 ml aluminum alloy cylinder, causing the extractant or liquid membrane to flow. When a two-way ball valve, 128, and a check valve, 130, are in the open position, the extractant flows into the module, 112, through the extractant or liquid membrane inlet, 115. The pressure of the extractant or liquid membrane is monitored by a pressure gage, 132, and regulated using a two-way ball valve, 134, so as to maintain an extractant or liquid membrane pressure which is less than that of the feed solution pressure when both are in the module (as discussed below, the microporous hollow fibers are hydrophobic CELGARD® fibers). The extractant or liquid membrane, when discharged through the extractant or liquid membrane outlet, 117, is stored in a conical flask, 136.

The solute, which is removed from the feed solution in the module, is discharged from the module through the solute outports, 121, using a vacuum pump, 138. The vacuum pressure is monitored using a pressure gage, 140. The discharged solute is condensed in the condensers, 142.

Figure 2:
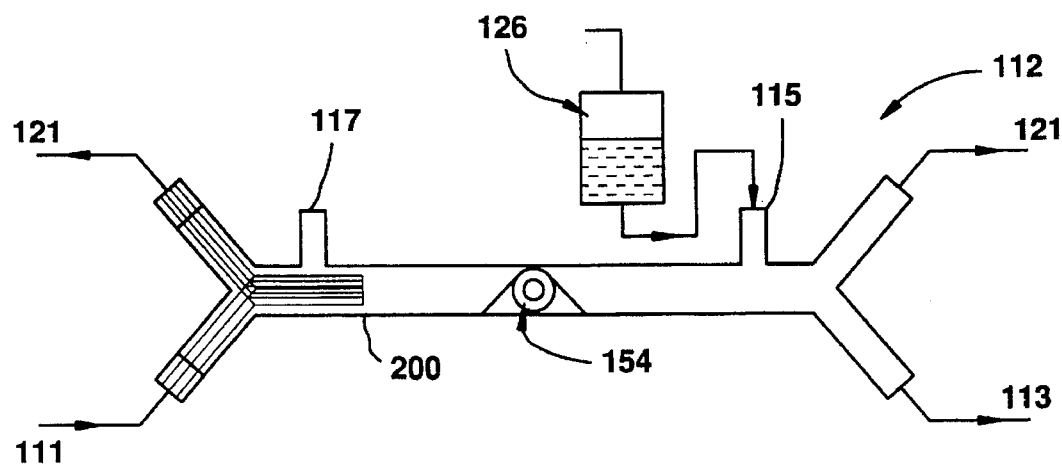
FIG. 2 is a schematic diagram of a solute transfer module within a hollow fiber contained liquid membrane pervaporation system.

FIG. 2 is a schematic drawing of an embodiment of the module. The module 112 has a liquid or fluid tight housing, 200. The aqueous feed solution flows into the fluid tight housing, through the feed solution inlet, 111, and is discharged through the feed solution outlet, 113. The feed solution contains volatile organic/inorganic compounds in an aqueous solution. The extractant or liquid membrane is stored in an extractant liquid membrane reservoir, 126, at a constant pressure and enters the fluid tight housing through the extractant or liquid membrane inlet, 115, and is discharged when necessary through the extractant or liquid membrane outlet, 117. Two sets of hollow fibers, 154, divide the liquid tight housing into a feed solution chamber, FIG. 3, 155, an extractant chamber, FIG. 3, 156, and FIG. 4, 156, and a vacuum atmosphere chamber FIG. 4, 160, where a vacuum is applied. One set of hollow fibers in aggregate form a tubular feed chamber where the feed solution flows.

Figure 3:
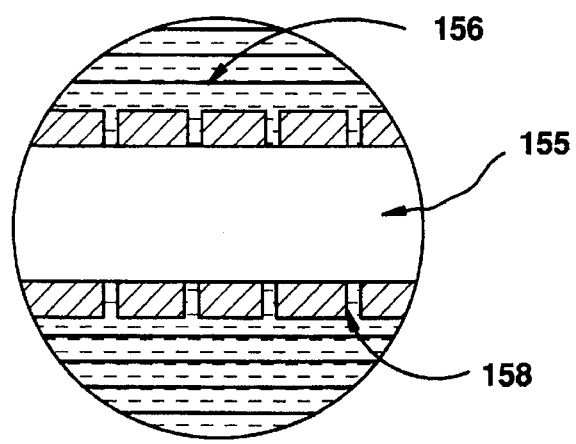
FIG. 3 is a cross-sectional view of a microporous hollow fiber.

These hollow fibers, as seen in FIG. 3, have microporous walls or membranes, 158, and may be hydrophilic or hydrophobic. Preferably, these microporous hollow fibers are hydrophobic.

A plurality of large numbers of such tubular hollow fibers provides a high value for the ratio of the surface area of porous membrane through which the solute transfer occurs to the volume of the vessel which contains the feed solution/ membrane/extractant system. Furthermore, interweaving of microporous hollow fibers containing the feed solution with the vacuum system hollow fibers greatly facilitates transfer of organic compounds from the feed solution to the vacuum.

Preferably, the walls of the tubular fibers are sufficiently thick relative to the diameter to permit the hollow fiber to withstand a compressive interface-immobilizing pressure difference without collapsing. When a liquid flows through a hollow tubular fiber, a significant pressure drop can occur between the inlet and outlet ends of the fiber. This pressure drop can be too great if the lumenal diameter is very small and the inlet flow rate too high.

Figure 4A:
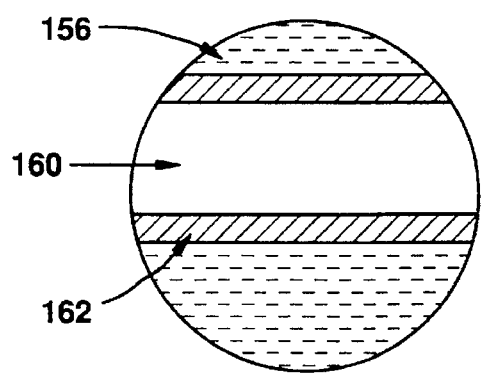
FIG. 4a is a cross-sectional view of a nonporous hollow fiber.
Figure 4B:
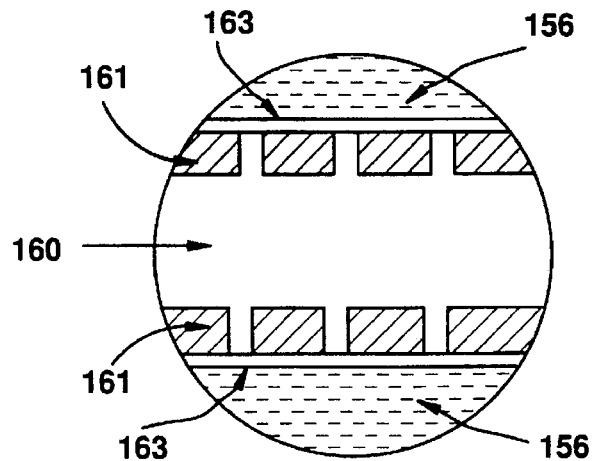
FIG. 4b is a cross-sectional view of a microporous hollow fiber with an ultrathin nonporous skin of plasma polymerized silicone, or dip-coated silicone on the hollow fiber outer surface.

The second set of hollow fibers found in the liquid tight housing form a tubular vacuum atmosphere chamber, FIGS. 4a and 4b, 160. In a preferred embodiment, as shown in FIG. 4b, the hollow fibers defining the tubular vacuum atmosphere chamber are microporous CELGARD® hollow fibers, 161, with an ultrathin nonporous skin of plasma polymerized silicone, 163, on the hollow fiber outer surface (available from AMT, Inc. Minnetonka, Minn.). Alternatively, the hollow fibers can be silicone rubber capillaries (Dow Corning, Midland, Mich.) with nonporous walls, as shown in FIG. 4a. The nonporous walls, 162, have a much higher permeability to organic solutes than to the extractant. For example, a negligible amount of decanol was found to permeate through the silicone rubber. Therefore, when the liquid extractant containing solute contacts the nonporous material, the solute, but not the extractant, diffuses through the nonporous walls into the vacuum chamber. A vacuum applied to the bores of the nonporous hollow fibers draws the solute, as a vapor, out of liquid tight housing at outlet ports, FIG. 2, 121. As shown in FIG. 1, the solute can be easily condensed in appropriately cooled, e.g., liquid $N_2$, traps, 142.

In addition to non-polar, low vapor pressure organic liquid extractant, a polar liquid extractant can be used to remove solute from nonpolar organic feed solutions. While low vapor pressure, high boiling liquids are preferred, higher vapor pressure, lower boiling polar liquids can also be used. Such liquids may have a greater ability to permeate the non-porous membrane and collect in the vacuum traps. However, since the polar liquid and vaporizable organic compounds are mutually insoluble, the materials collected in the trap can be readily separated using conventional liquid-liquid or liquid-solid separation techniques.

The following example is provided for a clearer understanding of the invention, and is intended to be exemplary of the invention, and not limiting.

EXAMPLE

Two hollow fiber contained liquid membrane (HFCLM) modules were constructed. The modules were tightly packed with microporous hydrophobic CELGARD® hollow fibers (Hoechst Celanese, SPD, Charlotte, N.C.) and silicone capillaries (Dow Corning, Midland, Mich.). More CELGARD® fibers were used to make the inner surface area of the CELGARD® fibers equal to the outside surface area of the silicone rubber capillaries. The procedure for making the HFCLM modules has been explained elsewhere [A. Sengupta, R. Basu and K. K. Sirkar, Separation of solutes from aqueous solutions by contained liquid membranes, AIChE J., 34 (10) (1988) 1698]. Parameters which describe these modules are listed in Table 1.

TABLE 1

Module parameters

| | Module one | | Module two | |
|---|---|---|---|---|
| Hollow fiber | CELGARD® X-20 | Silicone Rubber | CELGARD® X-10 | Silicone Rubber |
| Porosity | 0.40 | Nonporous | 0.20 | Nonporous |
| Tortuosity | 2.49 | | 3.50 | |
| Fiber outer diameter ($\mu$m) | 290 | 635 | 150 | 635 |
| Fiber inside diameter ($\mu$m) | 240 | 305 | 100 | 305 |
| No. of fibers | 96 | 36 | 258 | 40 |
| Liquid membrane thickness ($\mu$m) | 554 | | 626 | |
| Module length (cm) | 31.75 | | 24.13 | |
| Packing fraction | 0.61 | | 0.59 | |
| Mass transfer area | | | | |
| $cm^2$ | 233 | | 196 | |
| $m^2/m^3$ | 2267 | | 2538 | |
| Pore size ($\mu$m) | 0.03 | | 0.03 | |

A separate silicone rubber hollow fibers (SRHF) module to compare its performance with that of the HFCLM module was prepared by modifying the HFCLM module. This modification consisted of sealing the ends of the CELGARD® fibers. Wastewater was fed into the silicone rubber hollow fibers and vacuum was applied on the shell side. No organic liquid membrane was present on the shell side.

In Module 2, instead of CELGARD® X-20, CELGARD® X-10 hollow fibers were used. These CELGARD® X-10 fibers have a smaller diameter than those of CELGARD® X-20. The decision to employ them was made after the pressure drop due to flow in Module 1 was found to be less than expected.

The experimental setup is shown schematically in FIG. 1. The system is composed of five parts: the feed section, the liquid membrane reservoir, the HFCLM permeation module, the product collection section, and the vacuum system. The feed solution was prepared in a 4 liter glass bottle. Liquid membrane solvent was stored in a 500 ml aluminum alloy cylinder and delivered to the permeator shell side by applying $N_2$ pressure. A check valve was used to prevent contaminated solvent backflow. Vacuum was applied inside the silicone rubber capillaries by a vacuum pump.

Experimental Procedures

Synthetic wastewater feed was prepared by thoroughly mixing and dissolving trichloroethylene and/or toluene with water in a tank. The mixing took at least six hours due to the limited solute solubility in water. Feed concentrations for trichloroethylene and toluene were varied from 50 to 500 ppm.

For the HFCLM modules the shell side was first filled with decanol, the organic liquid membrane. Introduction and withdrawal of decanol was achieved through separate openings in the shell. The shell side was then pressurized to 6–7 psig with nitrogen. As decanol broke through the CELGARD® fiber wall pores into the tubes, distilled water was fed to sweep decanol out of the tubes. This procedure was continued for half an hour after which the pressure of the aqueous stream was increased to 8–10 psig which was greater than the organic phase pressure (6–7 psig) at every location of the permeator. This immobilized the organic phase at the pore mouths and prevented it from leaking into the aqueous phase. Vacuum was then applied to the inside of the silicone rubber hollow fibers. With the aqueous phase flowing inside the CELGARD® fibers, organic phase stationary on the shell side and the vacuum maintained inside the silicone rubber hollow fibers, samples for the effluent aqueous phase were collected at regular time intervals and solute concentrations in the effluent stream determined. Depending on the feed concentration, it took 10 to 20 hours to reach steady state.

The organic-water mixture collected in the permeate condensers separated into two phases. As expected, a negligible amount of decanol was found in this permeate in the vacuum side. The organic solute and water were separated and their volumes were measured. The operating time was also recorded. This information was used to determine water and solute fluxes. The solute flux was also determined from material balance on the aqueous stream in the CELGARD® fibers where the inlet and effluent flowrates and solute concentrations were known.

Inlet and outlet pressures of the aqueous phase, the shell side pressure and the pressure inside the silicone rubber hollow fibers were monitored using dial gauges. The feed flow rate was controlled by a micrometering valve. The operating parameters are listed in Table 2. The maximum aqueous phase pressure drops in Module 1 and Module 2 were 3 and 6.5 psi respectively; thus, pressure drop will not be a problem for CELGARD® fibers with inner diameters as low as 100 $\mu$m.

TABLE 2

Operating parameters of HFCLM and SRHF modules

| System Solute-Membrane | Feed side | | Pressure Range | | | |
|---|---|---|---|---|---|---|
| | Flow rate (ml/min) | $N_{Re}$ | $P_i$ (psig) | $P_o$ | $P_{Shell}$ | $P_v$ |
| *HFCLM Configuration* | | | | | | |
| Module one | | | | | | |
| TCE - Decanol | 3.0–10.0 | 2.0–8.0 | 9.0–12.0 | 8.0–9.0 | 6.0–8.0 | ~0.0 |
| Toluene - Decanol | 3.0–10.0 | 2.0–8.0 | 9.0–12.0 | 8.0–9.0 | 6.0–8.0 | ~0.0 |
| Module two | | | | | | |
| TCE - Decanol | 3.0–10.0 | 2.0–8.0 | 10.0–15.0 | 7.0–8.5 | 6.0–8.0 | ~0.0 |
| Toluene - Decanol | 3.0–10.0 | 2.0–8.0 | 10.0–15.0 | 7.0–8.5 | 6.0–8.0 | ~0.0 |
| *SRHF Configuration* | | | | | | |
| Module one | | | | | | |
| TCE - Silicone rubber | 3.0–10.0 | 5.0–20.0 | 8.5–10.0 | 8.0–9.5 | 6.5 | ~0.0 |
| Toluene - Silicone rubber | 3.0–10.0 | 5.0–20.0 | 8.5–10.0 | 8.0–9.5 | 6.5 | ~0.0 |

The operation of the SRHF pervaporation system with wastewater fed to the silicone rubber hollow fibers and vacuum applied to the shell is similar to that of the HFCLM system. Here, steady state was reached more rapidly than in the HFCLM, typically within a few hours.

Analytical Procedures

Aqueous trichloroethylene and toluene concentrations were determined using a liquid chromatograph (HP 1090) equipped with a filter photometric detector set at 230 nm and a Chromsep C18 column. The mobile phase consisted of 60% acetonitrile and 40% water at a flow rate of 0.4 ml/min.

Aqueous trichloroethylene concentrations were also determined by a gas chromatograph (HP 5896) having an electron capture detector and a fused silica 007 series column (Quadrex Corp., New Haven, Conn.); the results were found to be in good agreement with those determined using the liquid chromatograph.

Mass Transfer Process in the HFCLM (The Symbols used in the following equations are defined at end of Concluding Remarks)

To describe solute permeation in the HFCLM module, the solution-diffusion model will be adopted [I. Blume, J. G. Wijmans and R. W. Baker, The separation of dissolved organics from water by pervaporation, J. Membrane Sci., 49 (1990) 253; A. Sengupta, R. Basu and K. K. Sirkar, Separation of solutes from aqueous solutions by contained liquid membranes, AIChE J., 34 (10)(1988)1698]. The HFCLM module containing a large number of hollow fibers resembles a simple shell-and-tube type heat exchanger. An effective liquid membrane thickness between the feed fiber and the permeate fiber is further assumed [A. Sengupta, R. Basu and K. K. Sirkar, Separation of solutes from aqueous solutions by contained liquid membranes, AICHE J., 34 (10) (1988) 1698; A. Sengupta, R. Basu, R. Prasad and K. K. Sirkar, Separation of liquid solution by contained liquid membranes, Separation Science and Technology, 23 (12 & 13) (1988) 1735; S. Majumdar, A. K. Guha, Y. T. Lee and K. K. Sirkar, A two dimensional analysis of membrane thickness in a hollow fiber contained liquid membrane permeator, J. Membrane Sci., 43 (1989) 259]. The resistances-in-series approach is utilized to identify the role of various mass transfer resistances for the transfer of solutes under nonreactive conditions [A. Sengupta, R. Basu and K. K. Sirkar, Separation of solutes from aqueous solutions by contained liquid membranes, AIChE J., 34 (10) (1988) 1698; A. Sengupta, R. Basu, R. Prasad and K. K. Sirkar, Separation of liquid solution by contained liquid membranes, Separation Science and Technology, 23 (12 & 13) (1988) 1735].

The major assumptions of the model are as follows:

1. No two-dimensional mass transfer effects exist between the pore liquid and the outside liquid [A. Sengupta, R. Basu and K. K. Sirkar, Separation of solutes from aqueous solutions by contained liquid membranes, AIChE J., 34 (10) (1988) 1698].
2. Diffusion and solubility coefficients are constant and independent of concentration.
3. The solute is in the aqueous phase is in equilibrium with the organic solvent at the aqueous-organic interface.
4. Solute diffusion coefficient through the organic in the wall pores of CELGARD® fiber can be determined from the model of unhindered diffusion through a tortuous porous medium [A. Kiani, R. R. Bhave and K. K. Sirkar, Solvent extraction with immobilized interfaces in a microporous hydrophobic membrane, J. Membrane Sci., 20 (1984) 125].

Typical solute concentration profiles in the HFCLM permeator are shown in FIG. 5. The mass transfer areas for the feed and strip side hollow fibers are the same. For the HFCLM module a convenient way to define an overall mass transfer coefficient, K, would be according to the following equations [A. Sengupta, R. Basu and K. K. Sirkar, Separation of solutes from aqueous solutions by contained liquid membranes, AIChE J., 34 (10) (1988) D. Yang, Membrane removal of toxic volatile organics from wastewater, M. S. Thesis, Stevens Institute of Technology, Hoboken, N.J., 1992]:

$$R = K^* (\pi d_i^F N_F C_b^F - \pi d_i^S N_S C_b^S) \tag{1}$$

Here the solute transport rate per unit permeator length, R, is related to the individual mass transfer coefficients as follows:

$$R = \pi d_i^F N_F k_W^F (C_b^F - C_i^F) \quad (2a)$$

$$= \pi d_{im}^F N_F k_s^F (C_{im}^F - C_{om}^F) \quad (2b)$$

$$= \pi k_m (d_o^F N_F C_{om}^F - d_o^S N_S C_{om}^S) \quad (2c)$$

$$= \pi N_S d_{im}^S k_s^S (C_o^S - C_i^S) \quad (2d)$$

$$= \pi N_s d_i^S k_v^S (C_{io}^S - C_b^S) \quad (2e)$$

The following equilibrium relationships are also applicable:

$$C_{im}^F = m_d^F C_i^F, \quad C_{om}^S = m_d^S C_o^S, \quad C_i^S = m_v C_{io}^S \quad (3)$$

Since the concentration of the solute in the bulk gas in the bore of the silicone rubber hollow fibers where the vacuum is applied is negligibly small, $c_b^S$ can be taken to be equal to zero. Moreover, it is reasonable to assume that the solute concentration on the inner surface of the silicone rubber hollow fiber ($C_i^S$) as well as the concentration in equilibrium with $C_i^S$ on the vacuum side ($C_{io}^S$) are nearly zero.

A general equation for K can then be developed by combining the above equations:

$$\frac{1}{K} = \frac{1}{k_W^F} + \frac{d_i^F}{d_{im}^F m_d^F} * \frac{1}{k_s^F} + \frac{d_i^F}{d_o^F m_d^F} * \frac{1}{k_m} + \frac{d_o^S d_i^F}{d_{im}^S d_o^F} * \frac{1}{k_s^S * m_s} \quad (4)$$

where $m_s = m_d^F/m_d^S$ can be interpreted as the distribution coefficient between the silicone rubber and the aqueous phase.

Silicone Rubber Hollow Fiber (SRHF) Pervaporation System

Figure 6:
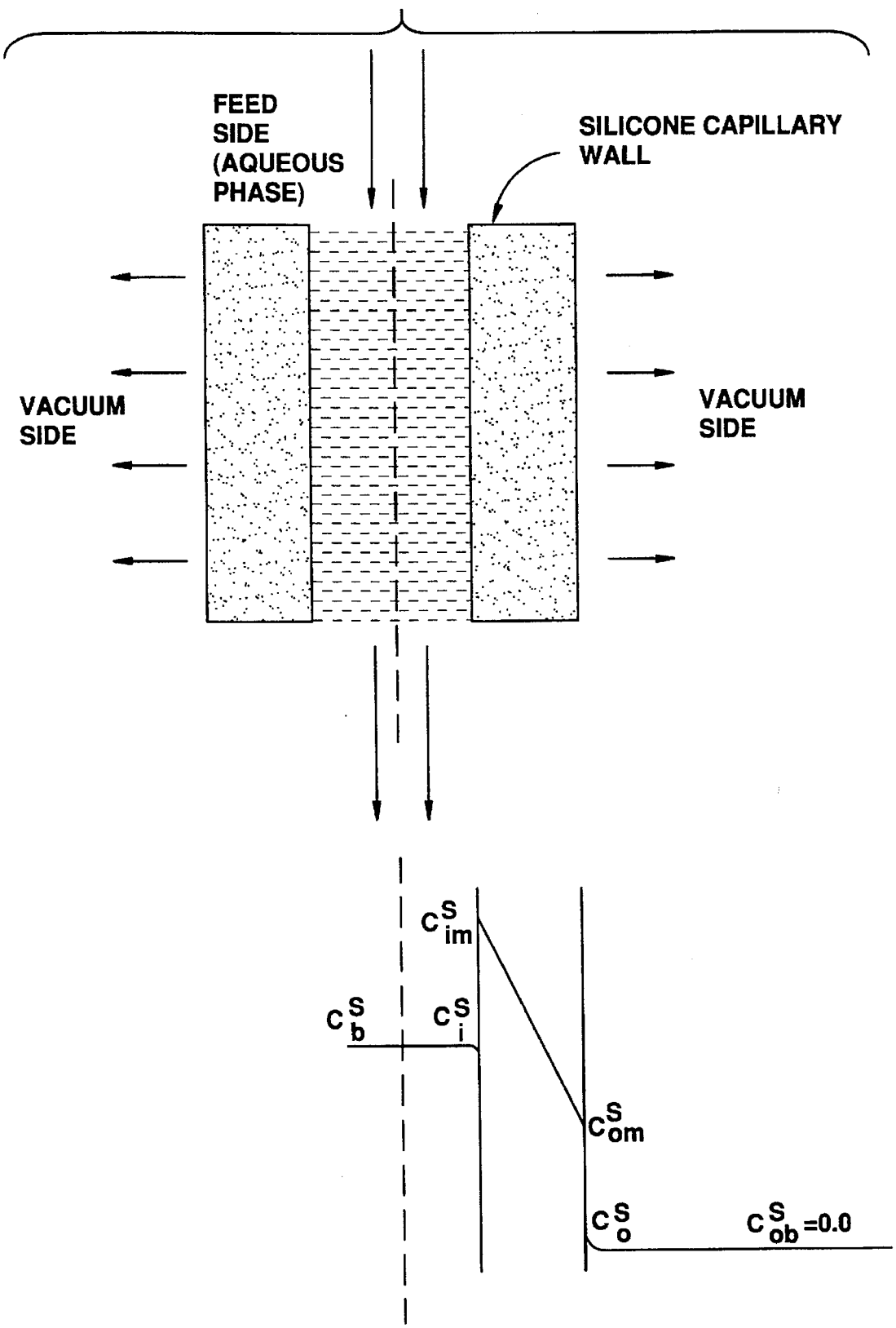
FIG. 6 shows typical solute concentration profiles in a Silicone Rubber Hollow Fiber (SRHF) pervaporator.

The HFCLM module (no. 1) constructed here was modified to make the SRHF pervaporation module by temporarily blocking the ends of the CELGARD® fibers, feeding the aqueous solution into the silicone rubber hollow fibers and applying vacuum in the shell side. Typical solute concentration profiles in the SRHF permeator are shown in FIG. 6. Solute permeation rates in terms of an overall mass transfer coefficient for this system can be written in a manner analogous to that for the HFCLM:

$$R^S = K^S \pi d_o^S N_S (C_b^S - C_{ob}^S) \quad (5)$$

In terms of the individual mass transfer coefficients, the solute permeation rates per unit permeator length can be written as follows:

$$R^S = k_W^S \pi d_i^S N_S (C_b^S - C_i^S) \quad (6a)$$

$$= k_s^S \pi d_{im}^S N_S (C_{im}^S - C_{om}^S) \quad (6b)$$

$$= k_v^S \pi d_o^S N_S (C_o^S - C_{ob}^S) \quad (6c)$$

One can also assume that the following equilibrium expressions hold at the interfaces:

$$C_{im}^S = m_s C_i^S, \quad C_{om}^S = m_v C_o^S \quad (7)$$

Since high vacuum exists on the shell side, $C_{ob}^S$, $C_o^S$ and $C_{om}^S$ are assumed to be zero. Rearrangement of the equations 6a–7 yields the following relation between the overall mass transfer coefficient for the SRHF permeator and the individual coefficients:

$$\frac{1}{K^S} = \frac{d_o^S}{k_W^S d_i^S} + \frac{d_o^S}{m_s k_s^S d_{im}^S} \quad (8)$$

Estimation of Individual Resistances to Mass Transfer

The individual mass transfer coefficients in equation (4) were determined as follows:

1. Liquid membrane resistance ($d_i^F/(d_o^F * m_d^F * k_m)$): Liquid membrane mass transfer coefficient, $k_m$, was determined from $k_m = D_{AB}/d_1$. Liquid membrane thickness, $d_1$, was calculated by employing the method developed by Majumdar et al. [S. Majumdar, A. K. Guha, Y. T. Lee and K. K. Sirkar, Two dimensional analysis of membrane thickness in a hollow fiber contained liquid membrane permeator, J. Membrane Sci., 43 (1989) 259]. In this method, the permeability of $CO_2$ in silicone rubber was first determined by measuring $CO_2$ permeation rates through the wall of the silicone rubber. In the HFCLM module (no. 1), $CO_2$ permeation rates were also determined through the combined layers of water placed in the shell side and the silicone rubber hollow fibers. It was assumed that the liquid membrane and silicone rubber layers in the HFCLM can be treated as a composite membrane.

$D_{AB}$ was obtained by using the following correlation [M. A. Lusis and G. A. Ratcliff, Diffusion in binary liquid mixtures at infinite dilution, Can. J. Chem. Eng., 46 (1968) 385]:

$$D_{AB} = 8.52*10^{-8} * V_{bB}^{-1/2} * \left[ 1.40 * \left( \frac{V_{bB}}{V_{bA}} \right)^{1/3} + \frac{V_{bB}}{V_{bA}} \right] * \frac{T}{\mu_{AB}} \quad (9)$$

where subscripts A and B refer to the organic solute and decanol respectively and $\mu_{AB}$ is replaced by $\mu_B$ since A is present in very low concentrations.

The distribution coefficient for the solute $m_d^F$ between the aqueous stream and decanol was measured separately and found to be 330–430 for trichloroethylene and 450–520 for toluene depending on concentration.

2. CELGARD® fiber wall resistance ($d_i^F/(d_{lm}^F * m_d^F * k_s^F)$): When solute diffuses through decanol filled pores of CELGARD® membrane, the mass transfer coefficient of the CELGARD® fiber wall ($k_s^F$) is described by [A. Sengupta, R. Basu and K. K. Sirkar, Separation of solutes from aqueous solutions by contained liquid membranes, AIChE J., 34 (10) (1988) 1698; A. Kiani, R. R. Bhave and K. K. Sirkar, Solvent extraction with immobilized interfaces in a microporous hydrophobic membrane, J. Membrane Sci., 20 (1984) 125; R. Prasad and K. K. Sirkar, Dispersion free solvent extraction with microporous hollow fiber modules, AIChE J., 34 (2) (1988) 177];

$$k_s^F = \frac{D_{AB} \epsilon_s}{\tau_s (d_o^F - d_i^F)/2} \quad (10)$$

The tortuosity factor $\tau_s$ was determined from previous experiments on hollow fiber CELGARD® membranes [A. Sengupta, R. Basu and K. K. Sirkar, Separation of solutes from aqueous solutions by contained liquid membranes, AIChE J., 34 (10) (1988) 1698; R. Prasad and K. K. Sirkar, Dispersion free solvent extraction with microporous hollow fiber modules, AIChE J., 34 (2) (1988) 177].

3. Aqueous phase film resistance ($1/k_W^F$): $k_W^F$ was obtained from the Graetz solution for parabolic flow in tubes [R. Prasad and K. K. Sirkar, Dispersion free solvent extraction with microporous hollow fiber modules, AIChE J., 34

(2) (1988) 177; A. H. P. Skelland, Diffusional Mass Transfer, Wiley, N.Y., 1974]. Diffusion coefficient ($D_W$) in the aqueous phase was determined from the Wilke-Chang [C. R. Wilke and P. Chang, Correlation of diffusion coefficients in dilute solutions, AIChE J., 1 (1955) 264] equation:

$$D_W = \frac{7.4 * 10^{-8} * (\xi M_B)^{0.5} * T}{\mu_{AB} * V_{bA}^{0.6}} \quad (11)$$

Calculations indicated that the mass transfer coefficient, $k_W^F$, becomes essentially constant after 3–4 cm into the tube. Since the module length is 31.75 cm, a constant value of $k_W^F$ was used without appreciable error.

4. Silicone rubber wall resistance ($d_o^S * d_i^F / (d_{lm}^S * d_o^F * m_s * k_s^S)$): The product $m_s * k_s^S$ was obtained experimentally. Here the mass transfer coefficient which includes the combined layers of the liquid film and the silicone rubber wall, ($K^S$), was first evaluated from experiments based on the SRHF pervaporation system. Equation (8) was then used to calculate $k_s^S$.

Results

The role of these various resistances to mass transfer was first considered. The individual mass transfer coefficients and resistances for a particular flow condition are listed in Table 3. Representative experimental values of K are also indicated in the table. Based on these values one observes that the major resistances are the liquid film resistance in the CELGARD® fibers and resistance of the silicone rubber hollow fiber wall. The increase in the resistance of the HFCLM module due to the CELGARD® wall and liquid membrane is only 9%. Further experimental and theoretical K values are quite close.

TABLE 3

Mass transfer coefficients and resistances for HFCLM system (Module one)

|  | Trichloroethylene | Toluene |
|---|---|---|
| $k_m$ (cm/sec) | $2.152 \times 10^{-5}$ | $2.013 \times 10^{-5}$ |
| $k_s^F$ (cm/sec) | $7.659 \times 10^{-5}$ | $7.158 \times 10^{-5}$ |
| $k_w^F$ (cm/sec)* | $1.359 \times 10^{-3}$ | $1.281 \times 10^{-3}$ |

TABLE 3-continued

Mass transfer coefficients and resistances for HFCLM system (Module one)

|  | Trichloroethylene | Toluene |
|---|---|---|
| $m_2 k_s^S \times 10^3$ (cm/sec) | 1.680 ~ 2.081 | 1.895 ~ 2.263 |
| $m_d^F$ | 350 ~ 402 | 470 ~ 525 |
| $d_i^F/d_o^F m_d^F k_m$ ($R_1$) (sec/cm) | 95.73 ~ 109.88 | 78.31 ~ 87.49 |
| $d_i^F/d_{lm}^F m_d^F k_s^F$ ($R_2$) (sec/cm) | 29.53 ~ 33.19 | 24.19 ~ 27.02 |
| $1/k_w^F$ ($R_3$)* (sec/cm) | 735.84 | 780.64 |
| $d_o^S d_i^F/d_{lm}^S d_o^F m_s k_s^S$ ($R_4$) (sec/cm) | 561.2 ~ 695.2 | 516.2 ~ 616.1 |
| $K \times 10^4$ (theoretical)* (cm/sec) | 6.769 ~ 6.842 | 6.202 ~ 6.248 |
| $K \times 10^4$ (experimental)* (cm/sec) | 6.350 ~ 7.031 | 6.617 ~ 7.146 |
| R (experimental)* (cm/sec) | 1422.27 ~ 1574.8 | 1399.38 ~ 1511.26 |
| ($R_1 + R_2$)/R | 8.8% ~ 9.1% | 7.3% ~ 7.6% |

*Feed flow conditions:
3.16 ~ 3.30 (ml/min) (TCE solution)
3.32 ~ 3.65 (ml/min) (Toluene solution)

Representative data for the HFCLM system shown in Table 4 list the effluent solute concentrations for varying inlet feed concentrations and flow rates for two HFCLM modules and for the SRHF configuration. This table includes data for single solutes as well as mixed solutes. General observations are: a) significant reductions in trichloroethylene (TCE) and toluene concentrations corresponding to over 90% recovery are possible with modules of lengths 32 cm and 24 cm respectively; further concentrations as low as 3–4 ppm are being achieved in the effluent treated streams; b) although Module 2 is considerably shorter than Module 1, its performance is comparable to that of Module 1 due to the utilization of smaller diameter CELGARD® fibers resulting in higher surface area per unit volume; c) the performances of the HFCLM modules follow the expected trends with respect to changes in flow rates and inlet concentrations with the effluent concentration increasing (or solute recovery decreasing) for increasing feed flow rates and inlet concentrations.

TABLE 4

Experimental data

Effect of Feed Concentration on Effluent Concentration

|  | C1(ppm) | C2(ppm) | Flow Rate(ml/min) | Module Type |
|---|---|---|---|---|
| 1. Trichlorethylene (TCE) Solution | 58 | 4 | 3.13 | HFCLM Module One |
|  | 104 | 8 | 3.20 | HFCLM Module One |
|  | 152 | 9 | 3.16 | HFCLM Module One |
|  | 417 | 22 | 3.29 | HFCLM Module One |
|  | 83 | 3 | 3.86 | HFCLM Module Two |
|  | 164 | 15 | 3.30 | HFCLM Module Two |
|  | 291 | 27 | 3.90 | HFCLM Module Two |
|  | 53 | 17 | 3.51 | SRHF Module One |
|  | 140 | 20 | 3.55 | SRHF Module One |
|  | 206 | 25 | 3.38 | SRHF Module One |
|  | 319 | 49 | 3.71 | SRHF Module One |
| 2. Toluene Solution | 95 | 8 | 3.64 | HFCLM Module One |
|  | 187 | 14 | 3.54 | HFCLM Module One |
|  | 500 | 23 | 3.32 | HFCLM Module One |

TABLE 4-continued

| Experimental data | | | |
|---|---|---|---|
| 83 | 24 | 3.46 | SRHF Module One |
| 249 | 52 | 3.55 | SRHF Module One |
| 500 | 84 | 3.48 | SRHF Module One |

| Effect of Feed Flow Rate on Effluent Concentration | | | |
|---|---|---|---|
| | Flow Rate(ml/min) | C1(ppm) | C2(ppm) | Module Type |
| 1. Trichloroethylene (TCE) Solution | 3.29 | 417 | 22 | HFCLM Module One |
| | 6.55 | 376 | 75 | HFCLM Module One |
| | 9.35 | 417 | 133 | HFCLM Module One |
| | 3.30 | 165 | 15 | HFCLM Module Two |
| | 6.39 | 162 | 36 | HFCLM Module Two |
| | 9.30 | 179 | 48 | HFCLM Module Two |
| | 3.70 | 319 | 49 | SRHF Module One |
| | 6.33 | 306 | 97 | SRHF Module One |
| | 9.30 | 257 | 125 | SRHF Module One |
| 2. Toluene Solution | 3.58 | 187 | 15 | HFCLM Module One |
| | 6.45 | 171 | 38 | HFCLM Module One |
| | 9.15 | 152 | 56 | HFCLM Module One |
| | 3.74 | 192 | 22 | HFCLM Module Two |
| | 6.33 | 193 | 46 | HFCLM Module Two |
| | 3.55 | 249 | 52 | SRHF Module One |
| | 5.85 | 250 | 81 | SRHF Module One |
| | 9.15 | 233 | 88 | SRHF Module One |
| 3. TCE and Toluene Mixture Solution Solute | | | | |
| TCE | 3.66 | 206 | 10 | HFCLM Module Two |
| TCE | 5.59 | 226 | 20 | HFCLM Module Two |
| Toluene | 3.66 | 204 | 13 | HFCLM Module Two |
| Toluene | 5.59 | 230 | 22 | HFCLM Module Two |

Tables 5 and 6 list percent solute removals, water fluxes, solute fluxes and separation factors for toluene and trichloroethylene in the HFCLM and SRHF pervaporation systems for different feed concentrations and flowrates. The separation factor expressing the separation efficiency between two permeating species is defined as follows [C. L. Zhu, C. W. Yuang, J. R. Fried and D. B. Greenberg, Pervaporation membranes—a novel separation technique for trace organics, Environmental Progress, 2 (2) (1983) 132]:

$$\alpha_{ij} = \left(\frac{y_i}{1-y_i}\right) * \left(\frac{1-x_i}{x_i}\right) = \left(\frac{J_i}{J_j}\right) * \left(\frac{C1_j}{C2_i}\right) \quad (12)$$

Table 5 shows that toluene recoveries in the HFCLM module range from 91 to 95% whereas for a comparable range of inlet concentrations and flowrates, recoveries in the SRHF module range from 71 to 83%. Similar results are obtained for trichloroethylene in Table 6.

TABLE 5

| Comparison of HFCLM and SRHF pervaporation system (toluene) | | | | | |
|---|---|---|---|---|---|
| C1 (ppm) | Flow Rate (ml/min) | Solute Recovery % | Toluene Flux (g/cm$^2$-min) × 10$^6$ | H$_2$O Flux (g/cm$^2$-min) × 10$^6$ | Separation Factor $\alpha_{ij}$ |
| HFCLM (Module One) | | | | | |
| 95.33 | 3.64 | 91 | 1.37 | 1.24 | 11597 |
| 187.06 | 3.58 | 92 | 2.68 | 1.34 | 10672 |
| 500.00 | 3.32 | 95 | 6.85 | 1.27 | 10365 |
| SRHF | | | | | |
| 83.13 | 3.46 | 71 | 0.89 | 6.98 | 1528 |
| 249.19 | 3.55 | 79 | 3.06 | 7.68 | 1595 |
| 500.00 | 3.48 | 83 | 6.29 | 7.71 | 1636 |

TABLE 6

Comparison of HFCLM and SRHF pervaporation system (trichloroethylene)

| C1 (ppm) | Flow Rate (ml/min) | Solute Recovery % | TCE Flux (g/cm²-min) × 10⁶ | H₂O Flux (g/cm²-min) × 10⁶ | Separation Factor $\alpha_{ij}$ |
|---|---|---|---|---|---|
| HFCLM (Module One) | | | | | |
| 152.52 | 3.16 | 94 | 1.96 | 3.18 | 4050 |
| 416.75 | 3.29 | 95 | 5.66 | 3.33 | 4072 |
| SRHF | | | | | |
| 52.50 | 3.51 | 73 | 0.57 | 8.95 | 1201 |
| 139.69 | 3.55 | 85 | 1.86 | 9.25 | 1434 |
| 205.06 | 3.38 | 87 | 2.65 | 9.85 | 1308 |
| 319.22 | 3.71 | 84 | 4.37 | 11.64 | 1176 |

Table 5 for toluene shows that water fluxes in the HFCLM system are lower by a factor of 6 to 6.5 and the separation factor higher by a factor of 7 than those in the SRHF pervaporation system. The corresponding results for TCE in Table 6 indicate that the water fluxes are lower by a factor of 3–3.5 whereas $\alpha_{ij}$ is greater by at least a factor of 3 in the HFCLM system. The solute fluxes in the HFCLM system are marginally higher than those in the SRHF system.

When the feed contains trichloroethylene, water fluxes are higher than when toluene is the solute. This is because trichloroethylene is a highly polar molecule interacting with water more strongly than toluene does [J. P. Brun, C. Larchef, G. Bulvestre and B. Auclair, Sorption and pervaporation of dilute aqueous solutions of organic compounds through polymer membranes, J. Membrane Sci., 25 (1985) 55]. When trichloroethylene and toluene were both present in the feed, water fluxes were nearly the same as when the feed contained only trichloroethylene. Another observation is that the water fluxes are not sensitive to the solute concentration in the feed. Other experiments at higher flow rates indicated that water fluxes are not affected by the flow rate of the feed aqueous stream. This observation is consistent with those of other investigators [C. Lipski and P. Cote, The use of pervaporation for the removal of organic contaminants from water, Environmental Progress, 9 (1990) 254; R. Psaume, P. Aptel, Y. Aurelle, J. C. Mora and J. L. Bersillon, Pervaporation; Importance of concentration polarization in the extraction of trace organics from water, J. Membrane Sci., 47 (1989) 373].

The higher separation factors for the HFCLM system are attributable to lower water flux and high selectivity of the liquid membrane for the solute. One also observes that separation factors for toluene are considerably higher than those for trichloroethylene which is due to the lower water flux and the higher distribution coefficient of toluene between decanol and water.

When a mixture of trichloroethylene and toluene are used, separation factors are dominated by the presence of trichloroethylene which produces the higher water flux and are comparable to the separation factors for trichloroethylene alone.

A differential material balance for the solute in the HFCLM module, where the mass flux of the solute is expressed as the product of the overall mass transfer coefficient and the concentration difference between the bulk liquid in the CELGARD® fibers and the vacuum side inside the silicone rubber, leads to the following equation upon integration:

$$\frac{C1}{C2} = \exp\left(-\frac{KN_F \pi d_i L_e}{Q}\right) \quad (13)$$

Figure 7:
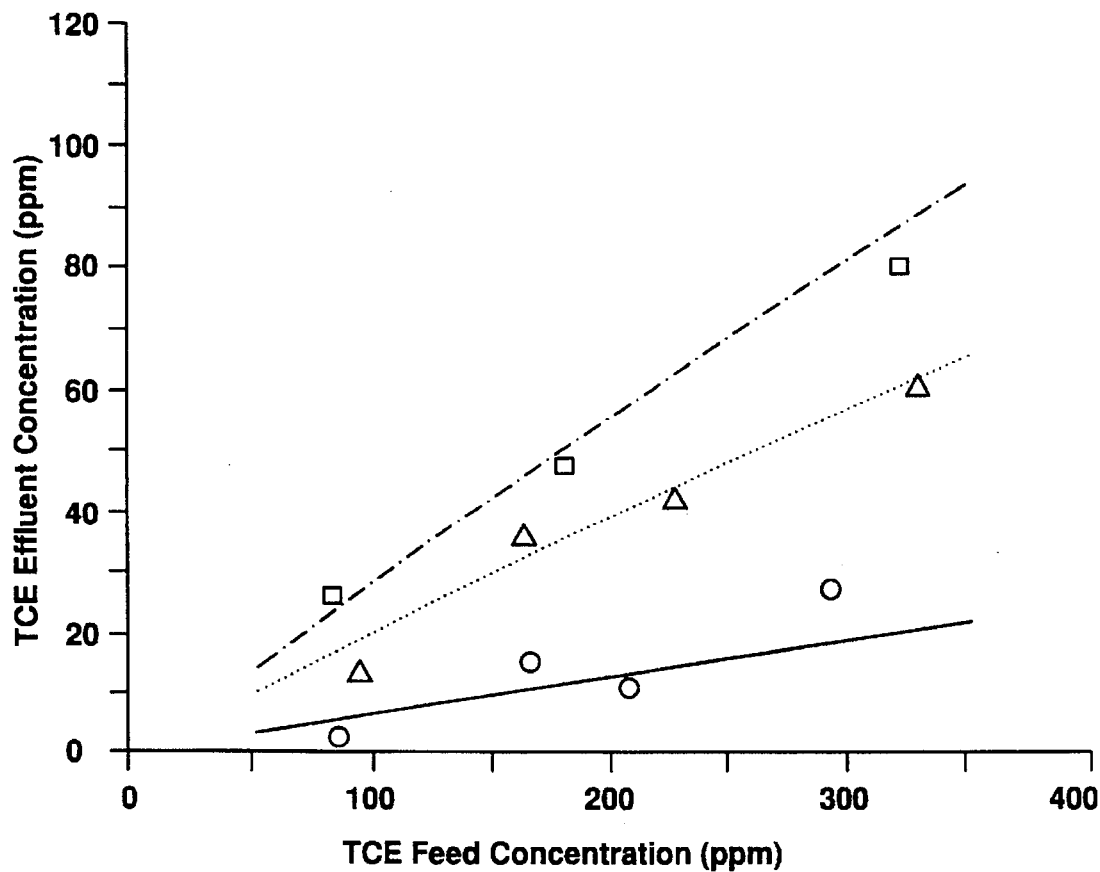
FIG. 7 is a comparison of the trichloroethylene effluent concentrations obtained experimentally with those predicted by equation (13).

A key assumption in this derivation is that K is constant along the module length. Equation (13) can be used to predict the effluent solute concentration of the aqueous stream (C2) using the overall mass transfer coefficient, K, obtained from equation (4). FIG. 7 compares the trichloroethylene effluent concentrations obtained experimentally with those predicted from equation (13). Further comparison of simulation results and experimental data is given in Table 7. These results, which show good agreement, indicate that the resistances-in-series approach in formulating the overall mass transfer coefficient in the HFCLM module is satisfactory.

It was noted that in constructing the HFCLM module, the number of CELGARD® and silicone rubber hollow fibers were determined on the basis that the inner surface area of

TABLE 7

Experimental and predicted effluent solute concentrations*

| Inlet Concentration (ppm) | Outlet Concentration (experimental) (ppm) | Outlet Concentration (theoretical) (ppm) | Flow Rate (ml/min) |
|---|---|---|---|
| TRICHLOROETHYLENE Module One | | | |
| 58.11 | 4.48 | 2.62 | 3.13 |
| 103.50 | 8.25 | 4.53 | 3.20 |
| 152.15 | 9.48 | 6.61 | 3.16 |
| 416.75 | 21.88 | 16.61 | 3.29 |
| TOLUENE Module One | | | |
| 95.33 | 8.65 | 8.70 | 3.64 |
| 187.06 | 14.62 | 13.50 | 3.54 |
| 500.00 | 25.68 | 22.88 | 3.32 |
| Module Two | | | |
| 191.85 | 21.62 | 16.10 | 3.74 |

*all data here except in FIG. 7 the CELGARD® fibers was roughly equal to the outer surface area of the silicone rubber. This choice is reasonable but not necessarily optimal from the viewpoint of maximizing the solute recovery. Hence, equation (13) would also be useful in optimizing the configuration of the HFCLM system.

The HFCLM pervaporation system was run continuously for 11 days for TCE removal. No change in performance was observed in this extended experiment [D. Yang, Membrane removal of toxic volatile organics from wastewater, M. S. Thesis, Stevens Institute of Technology, Hoboken, N.J., 1992] suggesting that the system was quite stable. A number of similar experiments reinforced this result.

It is important to point out here that despite the necessity of having to use two different sets of hollow fibers, it will be possible to have more mass transfer area with the HFCLM module than with the SRHF module having only the silicone rubber in the permeator. For experimental convenience we used the same module for the SRHF permeation system by sealing the ends of the CELGARD® fibers in the HFCLM permeator. If the CELGARD® fibers were removed, it would have been possible to put more silicone rubber into the same permeator. The relevant question here is how much more surface area would have been available in the SRHF and whether the additional area would result in higher solute recovery for the SRHF pervaporation system compared to the HFCLM. From Table 1 it is seen that the silicone rubber thickness of 165 μm is considerably larger than the CELGARD® wall thickness of 25 μm. This means that in the HFCLM system (Module 1) the silicone rubber hollow fibers already occupy almost two thirds of the cross sectional area taken up by all the hollow fibers. On the other hand, the inner surface area of the CELGARD® fibers is more than twice that of the silicone rubber.

Consequently, the HFCLM will still have about 30% more mass transfer area than the SRHF module packed only with the silicone rubber to the same density as the HFCLM. In practice it will not be possible to pack the SRHF module as tightly as the HFCLM because of the likely entanglement of the silicone rubber.

Another observation is that although the SRHF module employs a thick silicone rubber to minimize the water flux, silicone rubber thinner than the one used here (see, for example, the higher flux with a composite PFSA membrane [B. K. Dutta and S. K. Sikdar, Separation of azeotropic organic liquid mixtures by pervaporation, AIChE J., 37 (1991) 581]) should be acceptable in HFCLM because the solubility of water in the liquid membrane is low and the water flux is considerably less than in the SRHF. This indicates that the HFCLM has the potential of even higher surface areas per unit volume. Based on these considerations, the higher surface area advantage of the HFCLM modules should more than offset the minor additional resistance to mass transfer due to the liquid membrane relative to the SRHF pervaporation system and result in higher solute recovery for the same size permeator. This advantage, along with drastically decreased water flux and higher solute selectivities, makes the HFCLM pervaporation system a promising technology for the removal of volatile organics in aqueous streams.

Concluding Remarks

The hollow fiber contained liquid membrane (HFCLM) pervaporation system has been successfully employed for the removal of toxic volatile organics such as trichloroethylene and toluene from synthetic wastewater. In this system the aqueous stream is fed into one set of microporous CELGARD® hollow fibers which are packed in a shell-and-tube heat exchanger arrangement along with a second set of nonporous silicone rubber hollow fibers in which vacuum is applied. The two sets of hollow fibers are separated by the liquid membrane which is an organic solvent (decanol was used here) in which water has very low solubility. Trichloroethylene and toluene (along with a small amount of water) diffuse through the solvent-filled porous walls of the CELGARD® fiber into the liquid membrane medium and then diffuse through the walls of the silicone rubber hollow fibers into the vacuum side. The solutes are condensed and easily separated from water.

The HFCLM module performance was found to be consistently superior to silicone rubber hollow fiber (SRHF) pervaporation module with vacuum applied outside the silicone rubber hollow fibers containing the feed solution. The solute recovery and separation factors in the HFCLM module were greater than in the SRHF system. The water fluxes in the HFCLM were lower by a factor of 3–6.5. The superior performance of the HFCLM is due to the large surface area for mass transfer and the high selectivity of the liquid membrane toward the solute. The performance of the HFCLM pervaporation system for specified operating conditions was simulated with an equation derived from a differential material balance where the solute flux was written in terms of an overall mass transfer coefficient based on resistances-in-series model. The effluent concentrations of the solutes predicted with this model agreed well with the experimental data.

| | List of Symbols |
|---|---|
| $C1$ | inlet concentration of solute in the aqueous phase (mol/cm$^3$) |
| $C2$ | outlet concentration of solute in the aqueous phase (mol/cm$^3$) |
| $C_b^F$ | bulk phase solute concentration inside CELGARD® hollow fibers (mol/cm$^3$) |
| $C_b^S$ | bulk phase solute concentration inside silicone rubber hollow fibers (mol/cm$^3$) |
| $C_i^F$ | interfacial concentration inside the CELGARD® hollow fibers (mol/cm$^3$) |
| $C_i^S$ | solute concentration at the inner wall of the silicone rubber hollow fiber in the HFCLM or the interfacial concentration inside the silicone rubber hollow fiber in the SRHF (mol/cm$^3$) |
| $C_{im}^F$ | solute concentration at the inner wall of the CELGARD® hollow fiber (mol/cm$^3$) |
| $C_{im}^S$ | solute concentration at the inner wall of the silicone rubber in the SRHF (mol/cm$^3$) |
| $C_{io}^S$ | interfacial concentration inside the silicone rubber hollow fiber in the HFCLM (mol/cm$^3$) |
| $C_{om}^F$ | solute concentration at the outer wall of the CELGARD® hollow fiber (mol/cm$^3$) |
| $C_o^S$ | solute concentration at the outer wall of the silicone rubber hollow fiber in the HFCLM or interfacial concentration inside the silicone rubber in the SRHF (mol/cm$^3$) |
| $C_{om}^S$ | solute concentration at the outer wall of the silicone rubber in the SRHF or HFCLM (mol/cm$^3$) |
| $C_{ob}^S$ | solute concentration at the vacuum side of the SRHF (mol/cm$^3$) |
| $d_l$ | liquid membrane thickness (cm) |
| $d_i^F$ | inner diameter of the CELGARD® hollow fiber (cm) |
| $d_i^S$ | inner diameter of the silicone rubber hollow fiber (cm) |
| $d_{lm}^F$ | logarithmic mean diameter of the CELGARD® hollow fiber (cm) |
| $d_{lm}^S$ | logarithmic mean diameter of the silicone rubber hollow fiber (cm) |
| $d_o^F$ | outer diameter of the CELGARD® hollow fiber (cm) |
| $D_{AB}$ | diffusion coefficient of solute (A) in decanol (B) (cm$^2$/s) |
| $D_w$ | diffusion coefficient of the solute in the aqueous phase (cm$^2$/s) |
| HFCLM | hollow fiber contained liquid membrane |
| $J_i$ | permeation flux of species i (mol/cm$^2$-min) |
| $K$ | overall mass transfer coefficient in the HFCLM module defined by equation (1) (cm/s) |
| $k_m$ | mass transfer coefficient for mass transfer across the liquid membrane (cm/s) |
| $k_v$ | film mass transfer coefficient inside the silicone rubber hollow fibers (cm/s) |

List of Symbols

| Symbol | Description |
|---|---|
| $K^S$ | overall mass transfer coefficient for the SRHF module defined by equation (5) (cm/s) |
| $k_w^F$ | aqueous phase film mass transfer coefficient inside the CELGARD ® hollow fibers (cm/s) |
| $k_w^S$ | aqueous phase film mass transfer coefficient inside the silicone rubber hollow fibers (cm/s) |
| $k_s^F$ | mass transfer coefficient for mass transfer across the wall of the CELGARD ® hollow fiber (cm/s) |
| $k_s^S$ | mass transfer coefficient for mass transfer across the wall of the silicone rubber hollow fiber (cm/s) |
| $m_d^F$ | distribution coefficient for the solute between decanol and the aqueous phase |
| $m_d^S$ | distribution coefficient for the solute between decanol and the silicone rubber |
| $m_s$ | distribution coefficient for the solute between the silicone rubber and the aqueous phase |
| $m_v$ | distribution coefficient for the solute between silicone rubber and the vacuum side of the silicone rubber hollow fiber |
| $M_B$ | molecular weight of species B |
| $N_F$ | total number of CELGARD ® hollow fibers |
| $P_i$ | inlet aqueous stream pressure (psig) |
| $P_o$ | outlet aqueous stream pressure (psig) |
| $P_S$ | shell side pressure (psig) |
| $p_V$ | vacuum side pressure (psig) |
| Q | volumetric flow rate of the aqueous feed stream (ml/min) |
| R | solute permeation rate per unit permeator length in the HFCLM (mol/cm-s) |
| $R^s$ | solute permeation rate per unit permeator length in the SRHF (mol/cm-s) |
| SRHF | silicone rubber hollow fiber |
| T | temperature (°C) |
| $V_{bi}$ | vapor molar volume of species at the boiling point (cm³/gmol) |
| $x_i$ | mole fraction of component i in the liquid phase |
| $y_i$ | mole fraction of component i in the vapor phase |
| Greek Letters | |
| $\alpha_{ij}$ | separation factor of species i with respect to j |
| $\epsilon_S$ | porosity of the CELGARD ® fiber |
| $\mu_i$ | viscosity (g/cm-s) |
| $\xi$ | association factor, 2.6 for water as solvent |
| $\tau_S$ | tortuosity of pores in the CELGARD ® fiber |

The present invention is not to be limited in scope by the specific embodiments described herein. Indeed, various modifications of the invention in addition to those described herein will be apparent to those of skill in the art from the foregoing description and accompanying drawings. Such modifications, are intended to fall within the scope of the appended claims.

Various references are cited throughout the specification, the disclosures of which are each incorporated herein by reference in its entirety.

What is claimed is:

1. A method for removing and concentrating a vaporizable solute from an aqueous feed using a volatile compound removal system, said system having at least one porous membrane with a first side and a second side, a liquid extractant, at least one nonporous membrane with a first side and a second side and having a permeability selective to the vaporizable solute, a pressure difference control, and means for drawing off the solute from the second side of the nonporous membrane, comprising the steps of:

a. contacting the aqueous feed containing a vaporizable solute with the first side of said porous membrane;

b. contacting the liquid extractant with the second side of said porous membrane;

c. maintaining a pressure difference substantially within a predetermined pressure range, with said pressure difference control, between the liquid pressure of the aqueous feed and the liquid pressure of the liquid extractant so that one of the feed and the liquid extractant which substantially wets said porous membrane does not disperse through to the other of the feed and the liquid extractant, whereby the interface between the feed and the liquid extractant is substantially immobilized at said porous membrane; and d. contacting the liquid extractant with the first side of said nonporous membrane;

e. drawing off the solute from the second side of said nonporous membrane;

wherein the concentration of the solute at the second side of the nonporous membrane can be reduced to a lower level than the concentration of the solute at the first side of the nonporous membrane;

whereby the vaporizable solute in the aqueous feed is capable of being transferred across the liquid membrane situated in the porous membrane, into the liquid extractant, across the nonporous membrane, and away from the second side of the nonporous membrane; and whereby a concentration of the vaporizable solute in said liquid extractant is maintained below a saturation limit.

2. A method for removing and concentrating a vaporizable solute from an aqueous feed as in claim 1 wherein said vaporizable solute is a volatile organic compound.

3. A method for removing and concentrating a vaporizable solute from an aqueous feed as in claim 1 wherein said vaporizable solute is a volatile inorganic compound.

4. A method for removing and concentrating a vaporizable solute from an aqueous feed as in claim 1 wherein said means for drawing off the solute further comprises a vacuum means.

5. A method for removing and concentrating a vaporizable solute from an aqueous feed as in claim 1 further comprising the step of condensing the vaporizable solute exiting the second side of said nonporous membrane.

6. A volatile compound removal system for removing and concentrating a vaporizable solute from an aqueous feed, comprising:

a. a source of aqueous feed;

b. at least one porous membrane with a first side and a second side, wherein the aqueous feed contacts the first side;

c. at least one nonporous membrane with a first side and a second side and having a permeability selective to the vaporizable solute;

d. a liquid extractant in contact with the second side of said porous membrane and with the first side of said nonporous membrane;

e. a pressure difference control means for maintaining a predetermined pressure difference between a liquid pressure of the aqueous feed and a liquid pressure of the liquid extractant; and, f. means for drawing off the solute from the second side of said nonporous membrane;

wherein the concentration of the solute at the second side of the nonporous membrane can be reduced to a lower level than the concentration of the solute at the first side of the nonporous membrane;

whereby the vaporizable solute is capable of being transported out of the aqueous feed, through said porous membrane into said liquid extractant, out of said liquid extractant, through said nonporous membrane, and away from the second side of said nonporous membrane; and whereby a concentration of the vaporizable solute in said liquid extractant is maintained below a saturation limit.

7. A volatile compound removal system as defined in claim 6 wherein said at least one porous membrane comprises at least one hollow porous tube having a membrane thickness, wherein the first side of said porous membrane comprises an inner surface of the hollow porous tube, and wherein the second side of said porous membrane comprises an outer surface of the hollow porous tube.

8. A volatile compound removal system as defined in claim 6 wherein said at least one nonporous membrane comprises at least one nonporous hollow tube having a membrane thickness, wherein the first side of said nonporous membrane comprises an outer surface of the nonporous hollow tube, and wherein the second side of said nonporous membrane comprises an inner surface of the nonporous hollow tube.

9. A volatile compound removal system as defined in claim 8 wherein said at least one nonporous hollow tube comprises at least one porous hollow fiber having a thin nonporous layer of sheath cover disposed on the outer surface of said at least one porous hollow fiber.

10. A volatile compound removal system as defined in claim 9 wherein said thin nonporous layer is an ultrathin nonporous skin of plasma polymerized silicone.

11. A volatile compound removal system as defined in claim 10 wherein the membrane thickness of said porous hollow tube is about 1 μm to about 40 μm.

12. A volatile compound removal system as defined in claim 8 wherein said at least one nonporous hollow tube is composed of silicone rubber.

13. A volatile compound removal system as defined in claim 6 wherein said at least one porous membrane is composed of hydrophobic material.

14. A volatile compound removal system as defined in claim 6 wherein said liquid extractant is a high-boiling apolar organic liquid having very low solubility in water.

15. A volatile compound removal system as defined in claim 14 wherein said liquid extractant is selected from the group consisting of dodecane, decanol, octanol, vegetable oil, silicone oil, and mineral oil.

16. A volatile compound removal system as defined in claim 6 further comprising a condenser means for condensing the vaporizable solute exiting the second side of said nonporous membrane.

17. A volatile compound removal system as defined in claim 6 wherein said means for drawing off the solute further comprises a vacuum means.

18. A volatile compound removal system for removing and concentrating a vaporizable solute from an aqueous feed, for use with a liquid extractant, the system comprising:

a. a source of aqueous feed;

b. a porous membrane means including a plurality of hollow porous tubes having an inner surface, an outer surface and a membrane thickness, wherein the aqueous feed contacts the inner surface;

c. a nonporous membrane means including a plurality of hollow nonporous tubes having an inner surface, an outer surface, a membrane thickness, and a permeability selective to the vaporizable solute, wherein said plurality of hollow nonporous tubes are interspersed between said plurality of hollow porous tubes;

d. a fluid-tight housing means including an extractant chamber capable of being filled with the liquid extractant such that the liquid extractant is in contact with the outer surface of said hollow porous tubes and with the outer surface of said hollow nonporous tubes;

e. a pressure difference control means for maintaining a predetermined pressure difference between a liquid pressure of the aqueous feed and a liquid pressure of the liquid extractant so that one of the aqueous feed and the liquid extractant which substantially wets said hollow porous tubes does not disperse through to the other of the feed and the liquid extractant, whereby the interface between the feed and the liquid extractant is substantially immobilized at said hollow porous tubes; and f. means for drawing off the solute from the inner surface of said plurality of hollow nonporous tubes;

wherein said fluid-tight housing means contains said porous membrane means, said nonporous membrane means, and the liquid extractant;

wherein the concentration of the solute at the inner surface of the nonporous hollow tubes can be reduced to a lower level than the concentration of the solute at the outer surface of the nonporous hollow tubes;

whereby during operation of the system the vaporizable solute is capable of being transported out of the aqueous feed, through said hollow porous tubes into said liquid extractant, out of said liquid extractant, through said hollow nonporous tubes, and away from the inner surface of said hollow nonporous tubes; and whereby a concentration of the vaporizable solute in said liquid extractant is maintained below a saturation limit.

19. A volatile compound removal system as defined in claim 18 wherein said vaporizable solute is a volatile organic compound.

20. A volatile compound removal system as defined in claim 18 wherein said porous membrane is hydrophobic.

21. A volatile compound removal system as defined in claim 20 wherein said pressure difference control means maintains the liquid pressure of the feed at a higher pressure than the liquid pressure of the liquid extractant.

22. A volatile compound removal system as defined in claim 21 wherein said plurality of hollow nonporous tubes is a second plurality of porous hollow tubes and a thin nonporous layer of sheath cover disposed on the outer surface of said second plurality of porous hollow tubes.

23. A volatile compound removal system as defined in claim 22 wherein said thin nonporous layer of sheath cover is an ultrathin nonporous skin of plasma polymerized silicone.

24. A volatile compound removal system as defined in claim 23 wherein said liquid extractant is a high-boiling apolar organic liquid wherein water has very low solubility and which has very low solubility in water.

25. A volatile compound removal system as defined in claim 24 wherein said liquid extractant is selected from the group consisting of dodecane, decanol, octanol, vegetable oil, silicone oil, and mineral oil.

26. A volatile compound removal system as defined in claim 25 wherein said liquid extractant further comprises organic complexing agents which complex reversibly with the vaporizable solute.

27. A volatile compound removal system as defined in claim 26 wherein said complexing agent is selected from the group consisting of liquid ion exchangers, chelating agents, acid extracting agents, and basic extracting agents.

28. A volatile compound removal system as defined in claim 21 wherein said plurality of nonporous hollow tubes are fabricated from silicone rubber.

29. A volatile compound removal system as defined in claim 18 wherein said vaporizable solute is a volatile inorganic compound.

30. A volatile compound removal system as defined in claim 18 wherein said porous membrane is hydrophilic.

31. A volatile compound removal system as defined in claim 30 wherein said pressure difference control means maintains the liquid pressure of the liquid extractant at a higher pressure than the liquid pressure of the feed.

32. A volatile compound removal system as defined in claim 18 wherein said means for drawing off the solute further comprises a vacuum means.

33. A volatile compound removal system as defined in claim 18 further comprising a condenser means for condensing the vaporizable solute exiting the second side of said nonporous membrane.

34. A solute-transfer system for removing and concentrating a volatile organic compound from an aqueous feed comprising:
   a. a source of aqueous feed;
   b. a plurality of microporous hydrophobic polypropylene hollow fibers having an inner surface, an outer surface and a membrane thickness, wherein the aqueous feed is contacted with the inner surface;
   c. a plurality of nonporous tubes having an inner surface, an outer surface and a membrane thickness, and having a permeability selective to the vaporizable solute, wherein said plurality of nonporous tubes are interspersed between said plurality of hollow fibers;
   d. a fluid-tight housing means including an extractant chamber capable of being filled with a liquid extractant such that the liquid extractant is in contact with the outer surface of said hollow fibers and with the outer surface of said nonporous tubes;
   e. a pressure difference control means for maintaining a predetermined pressure difference between a liquid pressure of the aqueous feed and a liquid pressure of the liquid extractant so that the liquid extractant substantially wets said hollow fibers without dispersing through to the aqueous feed and the liquid extractant, whereby the interface between the aqueous feed and the liquid extractant is substantially immobilized at said porous membrane; and,
   f. means for drawing off the volatile organic compound from the inner surface of said plurality of nonporous tubes;

wherein said fluid-tight housing means contains said hollow fibers, said nonporous tubes, and said liquid extractant in a shell-and-tube type arrangement, wherein said extractant chamber is the shell and said liquid extractant is dispersed between said hollow fibers and said nonporous tubes;

wherein the concentration of the solute at the inner surface of the nonporous tubes can be reduced to a lower level than the concentration of the solute at the outer surface of the nonporous tubes;

whereby the volatile organic compound is capable of being transported out of the aqueous feed, through said hollow fibers into said liquid extractant, out of said liquid extractant, through said nonporous tubes, and away from the inner surface of said nonporous tubes; and whereby a concentration of the volatile organic compound in said liquid extractant is maintained below a saturation limit.

35. A solute-transfer system as defined in claim 34 wherein the inner surface area of said plurality of hollow fibers is approximately equal to the outer surface area of said nonporous tubes.

36. A solute-transfer system as defined in claim 35 wherein said plurality of hollow nonporous tubes is a plurality of porous hollow tubes having a thin nonporous layer of sheath cover disposed on the outer surface of said plurality of porous hollow tubes.

37. A solute-transfer system as defined in claim 36 wherein said thin nonporous layer of sheath cover is an ultrathin nonporous skin of plasma polymerized silicone.

38. A solute-transfer system as defined in claim 34 wherein said plurality of nonporous hollow tubes are fabricated from silicone rubber.

39. A solute-transfer system as defined in claim 34 wherein said liquid extractant is a high-boiling apolar organic liquid wherein water has very low solubility and which has very low solubility in water.

40. A solute-transfer system as defined in claim 39 wherein said liquid extractant is selected from the group consisting of dodecane, decanol, octanol, vegetable oil, silicone oil, and mineral oil.

41. A solute-transfer system as defined in claim 40 wherein said liquid extractant further comprises organic complexing agents which complex reversibly with the vaporizable solute.

42. A solute-transfer system as defined in claim 40 wherein said complexing agent is selected from the group consisting of liquid ion exchangers, chelating agents, acid extracting agents, and basic extracting agents.

43. A solute-transfer system as defined in claim 34 wherein the membrane thickness of each of said plurality of microporous hydrophobic polypropylene hollow fibers is about 1 µm to about 40 µm.

44. A solute-transfer system as defined in claim 34 further comprising an average spacing between the outer surface of the hollow fibers and the outer surface of the hollow tubes, wherein the average spacing is about 50 µm to about 1000 µm, wherein said liquid extractant occupies said average spacing.

45. A solute-transfer system as defined in claim 34 wherein said microporous hydrophobic polypropylene hollow fibers substantially have the properties of CELGARD® X-20.

46. A solute-transfer system as defined in claim 34 wherein said microporous hydrophobic polypropylene hollow fibers substantially have the properties of CELGARD® X-10.

47. A solute-transfer system as defined in claim 34 wherein said means for drawing off the volatile organic compound further comprises a vacuum means.

48. A solute-transfer system as defined in claim 34 further comprising a condenser means for condensing the volatile organic compound exiting the nonporous tubes.

* * * * *